(12) United States Patent
Danesh-Pajooh-Nejad et al.

(10) Patent No.: US 8,284,576 B2
(45) Date of Patent: Oct. 9, 2012

(54) MULTI-MODULE BIDIRECTIONAL ZERO VOLTAGE SWITCHING DC-DC CONVERTER

(75) Inventors: Hamid Danesh-Pajooh-Nejad, Kingsteon (CA); Hassan Ali Kojori, Mississauga (CA); Praveen Jain, Kingston (CA); Alireza Bakhshai, Kingston (CA)

(73) Assignee: Honeywell International Inc., Morristown, NJ (US)

( * ) Notice: Subject to any disclaimer, the term of this patent is extended or adjusted under 35 U.S.C. 154(b) by 288 days.

(21) Appl. No.: 12/761,472

(22) Filed: Apr. 16, 2010

(65) Prior Publication Data
US 2011/0254528 A1 Oct. 20, 2011

(51) Int. Cl.
*H02J 1/10* (2006.01)

(52) U.S. Cl. .............................. 363/65; 323/272; 363/15

(58) Field of Classification Search .................. 323/239, 323/271, 272, 324; 363/15, 16, 17, 24, 56.02, 363/65, 69, 71, 89, 98, 132
See application file for complete search history.

(56) References Cited

U.S. PATENT DOCUMENTS

| | | | | |
|---|---|---|---|---|
| 5,343,079 | A * | 8/1994 | Mohan et al. ................. | 307/105 |
| 6,574,125 | B2 | 6/2003 | Matsukawa et al. | |
| 7,030,512 | B2 | 4/2006 | Krein | |
| 7,218,081 | B2 | 5/2007 | Jang et al. | |
| 7,518,886 | B1 | 4/2009 | Lai et al. | |
| 7,596,007 | B2 | 9/2009 | Phadke et al. | |
| 2006/0152085 | A1 * | 7/2006 | Flett et al. ........................ | 307/75 |
| 2007/0296383 | A1 * | 12/2007 | Xu et al. ......................... | 323/282 |
| 2009/0196082 | A1 * | 8/2009 | Mazumder et al. ........... | 363/132 |
| 2010/0182814 | A1 * | 7/2010 | Tada et al. ..................... | 363/134 |
| 2012/0074949 | A1 * | 3/2012 | Kepley et al. ................. | 324/426 |
| 2012/0112731 | A1 * | 5/2012 | Foster ........................... | 323/361 |

* cited by examiner

*Primary Examiner* — Adolf Berhane
*Assistant Examiner* — Lakaisha Jackson
(74) *Attorney, Agent, or Firm* — Shimokaji & Assoc., PC (57) ABSTRACT

A multi-module bidirectional power converter may comprise a low side common node, a high side common node and at least first and second bidirectional DC/DC converter modules. The modules may comprise first and second low voltage switches, first and second high voltage switches and a transformer. The transformer may comprise a low side winding having first and second legs and a high side winding having first and second legs. The first leg of the low side winding may be connected with the first and second low voltage switches of the module. The second leg of the low side winding may be connected with the low side common node of the multi-module bidirectional power converter. The first leg of the high side winding may be connected with the first and second high voltage switches of the module. The second leg of the high side winding may be connected to the high side common node of the multi-module bidirectional power converter. Such an arrangement may provide operability of the multi-module bidirectional power converter with any one or more of the modules so that efficiency is maintained when electrical loads are high and so that Zero Voltage Switching is maintained when electrical loads are low.

19 Claims, 5 Drawing Sheets

MULTI-MODULE BIDIRECTIONAL ZERO VOLTAGE SWITCHING DC-DC CONVERTER

BACKGROUND OF THE INVENTION

The present invention generally relates to bidirectional power converters and more particularly to such power converters which may convert power at low power rates and high power rates up to 10 Kilowatts (KW) or more.

Recent advancements in electric renewable energy sources and storage systems like fuel cells, batteries and super capacitors, and increased demand for transportation equipment with increased electrical power requirements have resulted in a need for light weight and efficient power electronic converters. Because of reliability and other technical issues, optimal voltages for batteries and super capacitors are relatively low. On the other hand, for efficient power transmission (low $I^2R$ losses) between source and load these low voltages may need to be converted to higher values on a high voltage DC bus. The power flow may also be reversed in regenerative operations and also when batteries and super capacitors are charged. These issues are typically addressed with bidirectional DC to DC converters.

To have a compact and light weight converter, its operating frequency should be high so that the size of magnetics and capacitors can be reduced for the same amount of power. Also, the efficiency of the converter should be high not only for the sake of low energy losses, but also to reduce the size of cooling components which affect overall size and weight of the converters.

Operating at high switching frequency (e.g., above 100 KHz) may require soft switching techniques. In soft switching, a switching device may be switched (turned on or off) when the device has a zero voltage (zero voltage switching, ZVS) or zero current (zero current switching, ZCS). In frequencies above 20 KHz, switching losses are usually dominant causes of losses in switching devices, whereas below that frequency, conduction losses are dominant. Soft switching may also preclude damage to high frequency switching devices which may otherwise result from excessive internal switching losses at high frequencies even in no load conditions.

As can be seen, there is a need for a bidirectional converter which can operate with soft switching at high frequencies (e.g., 100 KHz or higher) and at high power levels (e.g., up to 10 KW) while performing with high efficiency. Additionally there is a need for such a power converter that may operate with soft switching even at low power levels.

SUMMARY OF THE INVENTION

In one aspect of the present invention, a multi-module bidirectional power converter operable in a multi-module mode and in a single module mode may comprise: a low side common node; a high side common node; at least a first and a second bidirectional DC/DC converter module each comprising: first and second low voltage switches; first and second high voltage switches; a transformer comprising; a low side winding having first and second legs; and a high side winding having first and second legs; wherein the first leg of the low side winding is connected with the first and second low voltage switches of the module; wherein the second leg of the low side winding is connected with the low side common node of the multi-module bidirectional power converter; wherein the first leg of the high side winding is connected with the first and second high voltage switches of the module; and wherein the second leg of the high side winding is connected to the high side common node of the multi-module bidirectional power converter; and whereby the multi-module bidirectional power converter is operable with any one or more of the modules so that efficiency may be maintained when electrical loads are high and so that Zero Voltage Switching is maintained when electrical loads are low.

In another aspect of the present invention, a multi module bipolar bidirectional power converter operable with one or more of its modules may comprise: a gating controller connected to control gating for any one or more power converter modules; a bipolar low side DC bus having a positive rail, a negative rail and a neutral point; a bipolar high side DC bus having a positive rail, a negative rail and a neutral point; at least a first and second ones of the power converter modules, comprising: a first low voltage switch having a first side connected to the positive rail of the bipolar low side DC bus; a second low voltage switch having a first side connected to the negative rail of the bipolar low side DC bus; the first and second low voltage switches having second sides that are connected together; an inductor interposed between the low side DC bus neutral point and the second sides of the first and second low voltage switches; a low side winding of a transformer having a first leg connected to the inductor and having a second leg connected to the neutral point of the low side DC bus; a first high voltage switch having a first side connected to the positive rail of the bipolar high side DC bus; a second high voltage switch having a first side connected to the negative rail of the bipolar high side DC bus; the first and second high voltage switches having second sides that are connected together; and a high side winding of a transformer having a first leg connected to the second sides of the first and second high voltage switching devices and having a second leg connected a neutral point of the high side DC bus.

In still another aspect of the present invention, a method for bidirectional conversion of power may comprise the steps of: converting power through a plurality of interconnected power conversion modules operated in succession; and employing a phase shifting gating pattern so that each module is operated with a phase shift relative to a prior module of the succession and a phase shift relative to a subsequent module in the succession.

These and other features, aspects and advantages of the present invention will become better understood with reference to the following drawings, description and claims.

DETAILED DESCRIPTION OF THE INVENTION

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

Various inventive features are described below that can each be used independently of one another or in combination with other features.

Broadly, embodiments of the present invention generally provide apparatus and methods for bidirectional conversion of DC power. A converter may be operated in a multi-module mode so that high amounts of power (e.g., 10 KW or higher) may be converted. When loads are low the converter may be operated as a single low power module so that switching in a zero voltage mode may be performed.

Figure 1:
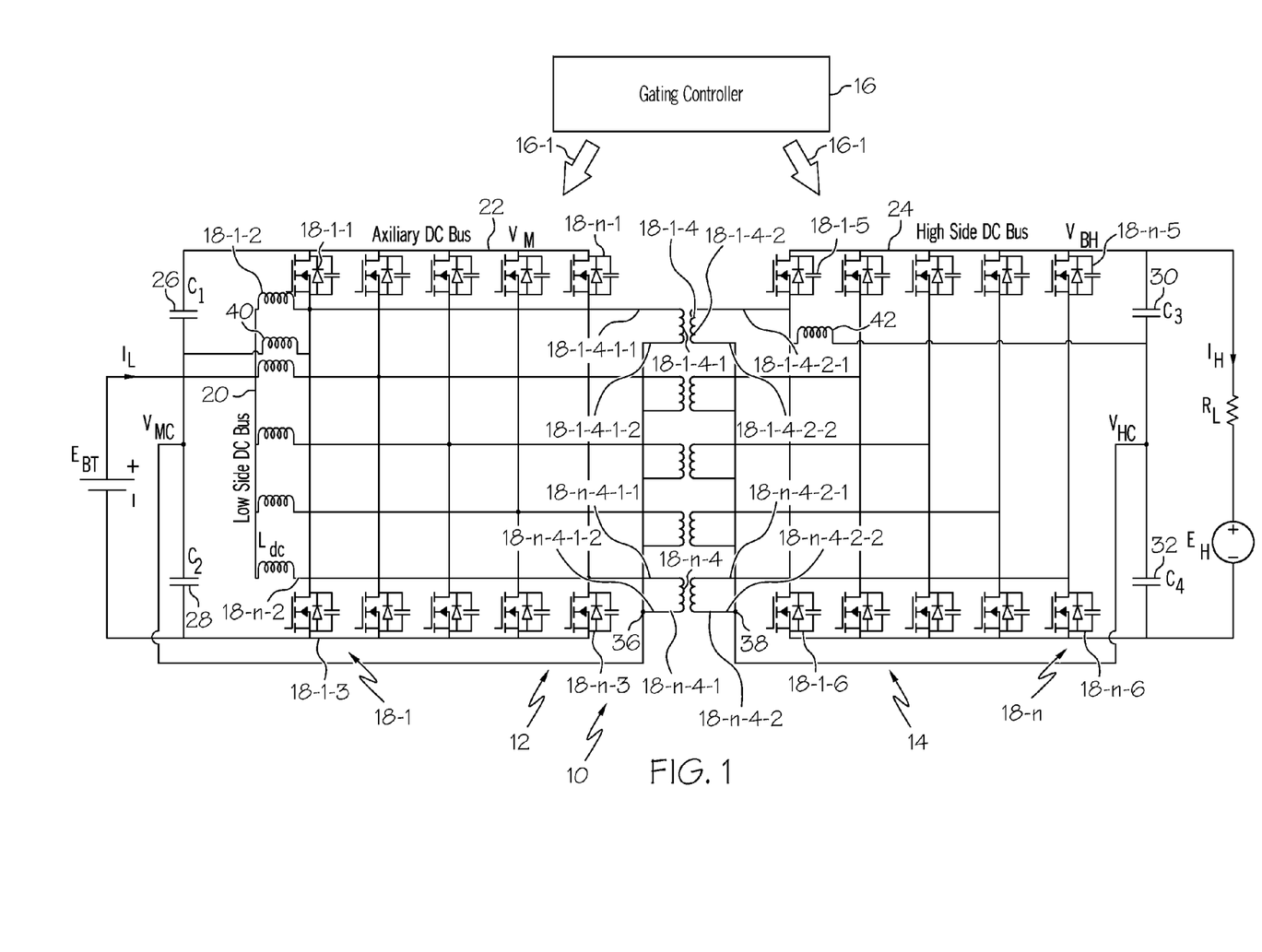
FIG. 1 is a block diagram of a multi-module bidirectional power converter in accordance with an embodiment of the present invention.

Referring now to FIG. 1, a block diagram illustrates a multi-module bidirectional power converter designated generally by the numeral 10. The power converter comprises a low voltage or low side 12, a high voltage or high side 14 and a gating controller 16. The power converter 10, in an exemplary embodiment, may comprise a plurality of power conversion modules 18-1 through 18-n having their respective components distributed throughout the power converter 10. The power converter 10 may comprise any number of the modules. In FIG. 1, five modules are shown. For purposes of simplicity, only a first module 18-1 and an nth module 18-n are numerically identified on FIG. 1.

The first module 18-1 may comprise a first solid state low voltage switching device or switch 18-1-1, an inductor 18-1-2, a second solid state low voltage switching device or switch 18-1-3, a transformer 18-1-4, a first high voltage switch or switch 18-1-5 and a second high voltage switch or switch 18-1-6. Similarly a module 18-n may comprise a first low voltage switch 18-n-1, an inductor 18-n-2, a second low voltage switch 18-n-3, a transformer 18-n-4, a first high voltage switch 18-n-5 and a second high voltage switch 18-n-6. The modules 18-1 through 18-n may be connected to a low side DC bus 20, an auxiliary DC bus 22 and a high side DC bus 24.

In the exemplary embodiment of FIG. 1, each of the modules 18-1 through 18-n may comprise a dual half bridge (DHB) converter with each of the modules 18-1 through 18-n having dedicated inductors 18-1-2 through 18-n-2 but with shared splitting capacitors 26, 28, 30 and 32. Each of the low voltage switches 18-1-3 through 18-n-3 and each of the high voltage switches 18-1-5 through 18-n-5 may be a metal oxide field effect transistor (MOSFET) which may have parasitic intrinsic capacitors. Use of MOSFETS for switching devices may be preferred over integrated gate bipolar transistors (IGBT) because MOSFETS may be more effective for high frequency operation (e.g., higher than 50 KHz).

The transformers 18-1-4 through 18-n-4 may be selected to include leakage inductance ($L_K$) as a parasitic element. Such transformers may be preferred because the leakage inductance may provide energy storage which may be useful for power transmission. Additionally the leakage inductance may contribute to maintenance of zero voltage switching (ZVS) of the switching devices.

In an exemplary embodiment of the invention, low side windings 18-1-4-1 through 18-n-4-1 of the transformers 18-1-4 through 18-n-4 may have first legs 18-1-4-1-1 through 18-n-4-1-1 connected to the first and second low voltage switches 18-1-1 through 18-n-1 and 18-1-3 through 18-n-3. Second legs 18-1-4-1-2 through 18-n-4-1-2 may be connected to a low side common node 36. Similarly, high side windings 18-1-4-2 through 18-n-4-2 of the transformers 18-1-4 through 18-n-4 may have first legs 18-1-4-2-1 through 18-n-4-2-1 connected to the first and second high voltage switches 18-1-5 through 18-n-5 and 18-1-6 through 18-n-6 and second legs 18-1-4-2-2 through 18-n-4-2-2 connected a high side common node 38. Such an arrangement may facilitate the power converter 10 being operable with any one or more of the modules.

In operation, the gating controller 16 may produce gating signals 16-1 to the switching devices 18-1-3 through 18-n-3 and 18-1-5 through 18-n-5 so that the modules 18-1 through 18-n may act successively as DHB converters with phase shifting between each successive converter operation. In an exemplary embodiment, the phase shifting may be symmetrical so that input and output ripple currents are minimized and so the splitting capacitors 20 and 22 are exposed to minimized ripple currents.

In an exemplary embodiment, each of the modules 18-1 through 18-n may be operated successively with the same gating signals but with a fixed $2\pi/n$ phase shift. Effective fundamental frequency of ripple currents and voltages on DC buses 20, 22 and 24 and the splitting capacitors 26, 28, 30 and 32 may be n times switching frequency. This may minimize required filtering and required size of the splitting capacitors 26, 28, 30 and 32. Because of phase shifting, AC currents in the transformers 18-1-4 through 18-n-4 may circulate mostly within the transformers and only partially through the capacitors 26, 28, 30 and 32. Symmetrical phase shifting may also reduce magnitude of ripples because fundamental ripples may cancel each other. Also other harmonics may not be in phase. So symmetrical phase shifting may not only increase the fundamental frequency of the ripple but may also decrease its magnitude.

As is well known, in light load conditions, efficiency of conventional converters may diminish and also ZVS may be lost. In the present invention some of the modules may be turned off so that load may be increased on the remaining modules. Thus efficiency may remain high and the converter 10 may continue to operate with ZVS. For example, module 18-1 may be allowed to continue its operation while the remaining modules are made inoperative. A shunt auxiliary inductance 40 may be connected with a primary winding 18-1-4-1 of the transformer 18-1-4. The auxiliary shunt inductor 40 may add some lagging current and may extend a ZVS margin of the switches 18-1-1 and 18-1-3. Presence of the shunt auxiliary inductor 40 may produce a small reduction of overall efficiency because of circulating current in the shunt auxiliary inductor 40. But, because the auxiliary shunt inductor 40 may be used for only one of the modules, loss of efficiency may be negligible in high power ratings.

In some exemplary embodiments of the invention, an auxiliary shunt inductor 42 may be placed in the high side 14 of the converter 10 as shown in FIG. 1. The auxiliary shunt inductor 42 may be employed in lieu of the auxiliary shunt inductor 40, or it may be used as an adjunct to the inductor 40. Auxiliary shunt inductors may also be used for other modules in the same manner to keep ZVS in light load when all modules in operation.

Figure 2:
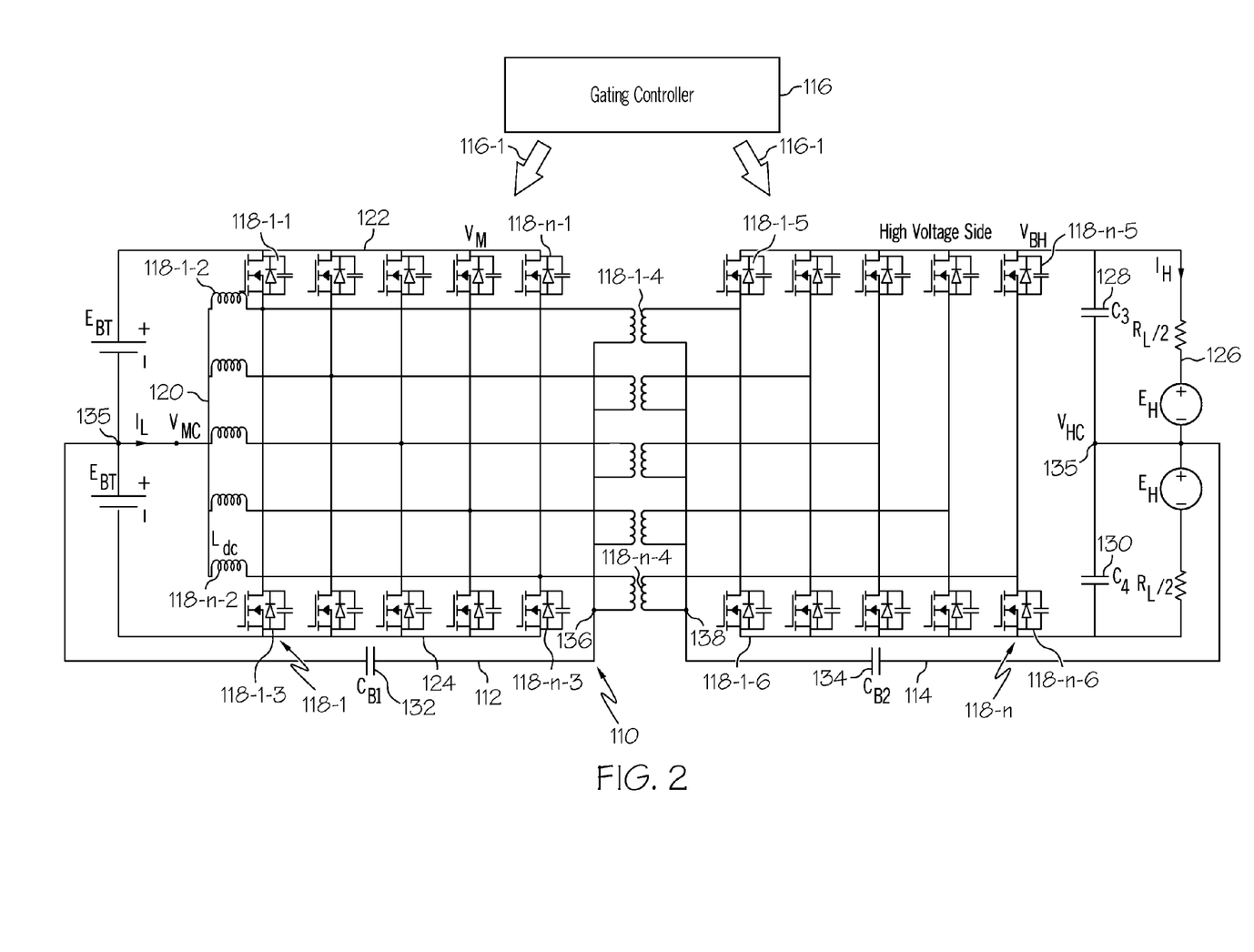
FIG. 2 is a block diagram of a bipolar bidirectional power converter in accordance with an embodiment of the present invention.

Referring now to FIG. 2, an exemplary embodiment of a bidirectional converter 110 is shown in a bipolar configuration. The power converter may comprise a low voltage or low side 112, a high voltage or high side 114 and a gating controller 116. The power converter 110, in an exemplary embodiment, may comprise a plurality of power conversion modules 118-1 through 118-n having their respective components distributed throughout the power converter 110. The power converter 110 may comprise any number of the modules. In the exemplary embodiment of FIG. 2, five modules are shown. For purposes of simplicity, only a first module 118-1 and an nth module 118-n are numerically identified on FIG. 2.

The first module 118-1 may comprise a first low voltage switch 118-1-1, an inductor 118-1-2, a second low voltage switch 118-1-3, a transformer 118-1-4, a first high voltage switch 118-1-5 and a second high voltage switch 118-1-6. Similarly a module 118-n may comprise a first low voltage switch 118-n-1, an inductor 118-n-2, a second low voltage switch 118-n-3, a transformer 118-n-4, a first high voltage switch 118-n-5 and a second high voltage switch 118-n-6. The modules 118-1 through 118-n may be interconnected through a low side DC bus 120, a positive rail 122, a negative rail 124 and a high side DC bus 126.

In the exemplary embodiment of FIG. 2, each of the modules 118-1 through 118-n may comprise a dual half bridge (DHB) converter with each of the modules 118-1 through 118-n having dedicated inductors 118-1-2 through 118-n-2 but with shared high-side splitting capacitors 128 and 130. Each of the low voltage switches 118-1-3 through 118-n-3 and each of the high voltage switches 118-1-5 through 118-n-5 may be a metal oxide field effect transistor (MOSFET) which may have parasitic intrinsic capacitance. Each of the transformers 118-1-4 through 118-n-4 may include leakage inductance ($L_K$) as a parasitic element.

In operation, the gating controller 116 may produce gating signals 116-1 so that the modules 118-1 through 118-n may act with a 50% duty cycle. Then the converter 110 may be capable of operating with bipolar voltage sources (e.g., ±28V and/or ±270V). In this configuration the converter 110 may be provided with improved reliability because even if one of the two buses (+or −) may become inoperative, the converter 110 may operate. Furthermore, the converter 110 may be operated with double voltage, so the bus conduction losses ($I^2R$) may reduced by almost 25%.

Throughout its operation, the converter 110 may always utilize a 50% duty cycle and may have continuous current in the inductors 118-1-2 through 118-n-2. Bipolar buses may be used and the splitting capacitors 128 and 130 may be very small and employed just for filtering to carry high frequency currents and to keep high frequency noises off the buses and DC sources. Neutral points 135 of the buses (i.e., zero volts) may be connected to common nodes 136 and 138 of the converter 110. Series DC blocking capacitors 132 and 134 in center point connections may be needed to prevent any possible DC current in the transformers 118-1-4 through 118-n-4.

If there is imbalance between positive and negative voltages of a bipolar bus, converter 110 may naturally transfer power from a stronger one (higher voltage) to a weaker one (lower voltage) (e.g., from +28V bus to −275V). If a 50% duty cycle is maintained, internal balancing current may be limited only by internal resistances of the positive and negative buses (and sources). By controlling the duty cycle of each side separately this current may be controlled.

There may be three controlling parameters for the converter 110, duty cycle at the low side 112, duty cycle at high side 114 and the phase shift between the low side 112 and the high side 114. (Duration of dead time between the ON-periods of switches on the same leg, as a controlling parameter may be used to maintain ZVS. Change of dead time as a controlling parameter may be considered as duty cycle change. Thus changing dead time may be considered a separate controlling parameter or as another factor in controlling the duty cycle.) The phase shift may be used for regulating load side voltage (or the amount of power transfer) and thus the two other control parameters can be used for other purposes like balancing bipolar buses. Consequently the converter may be able to compensate for imbalanced voltage in bipolar buses.

Figure 3:
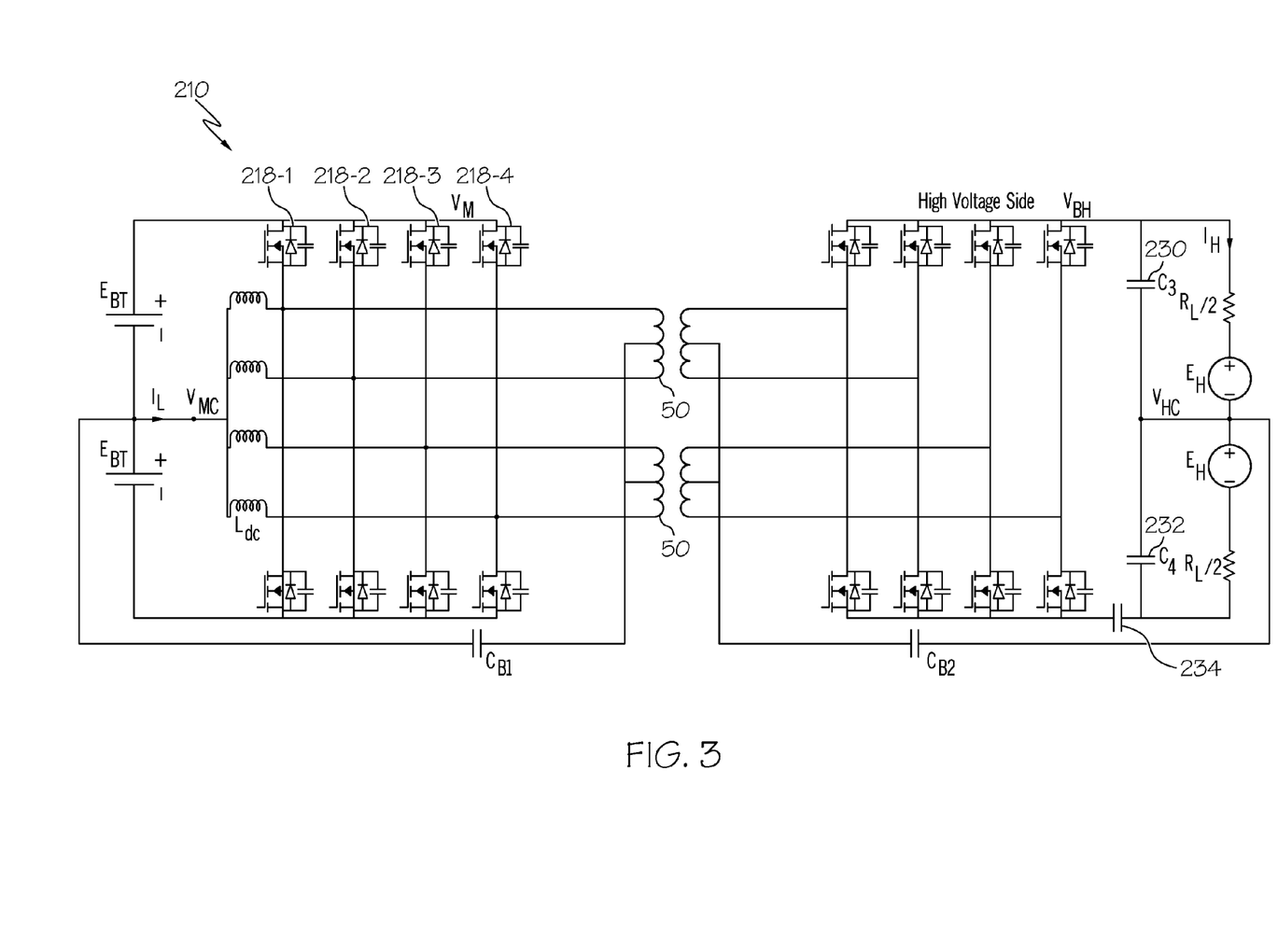
FIG. 3 is a block diagram of a bidirectional power converter with an even number of modules in accordance with an embodiment of the present invention.

Referring now to FIG. 3, a block diagram illustrates a converter 210 which may comprise an even number of modules. As shown in FIG. 3, the converter may comprise four modules 218-1, 218-2, 218-3 and 218-4. When there are an even number of modules in the converter 210, integrated and center tapped transformers 50 may be employed. In this configuration, modules with 180° phase shift may be paired.

In this technique, it may be important to mitigate adverse dynamic behavior of the converter 210 and to maintain soft switching during transients that may result from phase shift value between modules, particularly when the converter 210 may be operating under a light load. Turning modules on and off may impose some short transients. Having enough bus capacitance may provide the desired mitigation. Presence of sufficient bus capacitance may avoid rapid changes in power transfer and may give enough time to the converter controller to smoothly change the phase shifts.

Splitting capacitors 230 and 232 may provide a portion of desired bus capacitance. An additional amount of bus capacitance identified by the numeral 234 may be added to the splitting capacitors in order to assure smooth operation of the converter 210.

Figure 4:
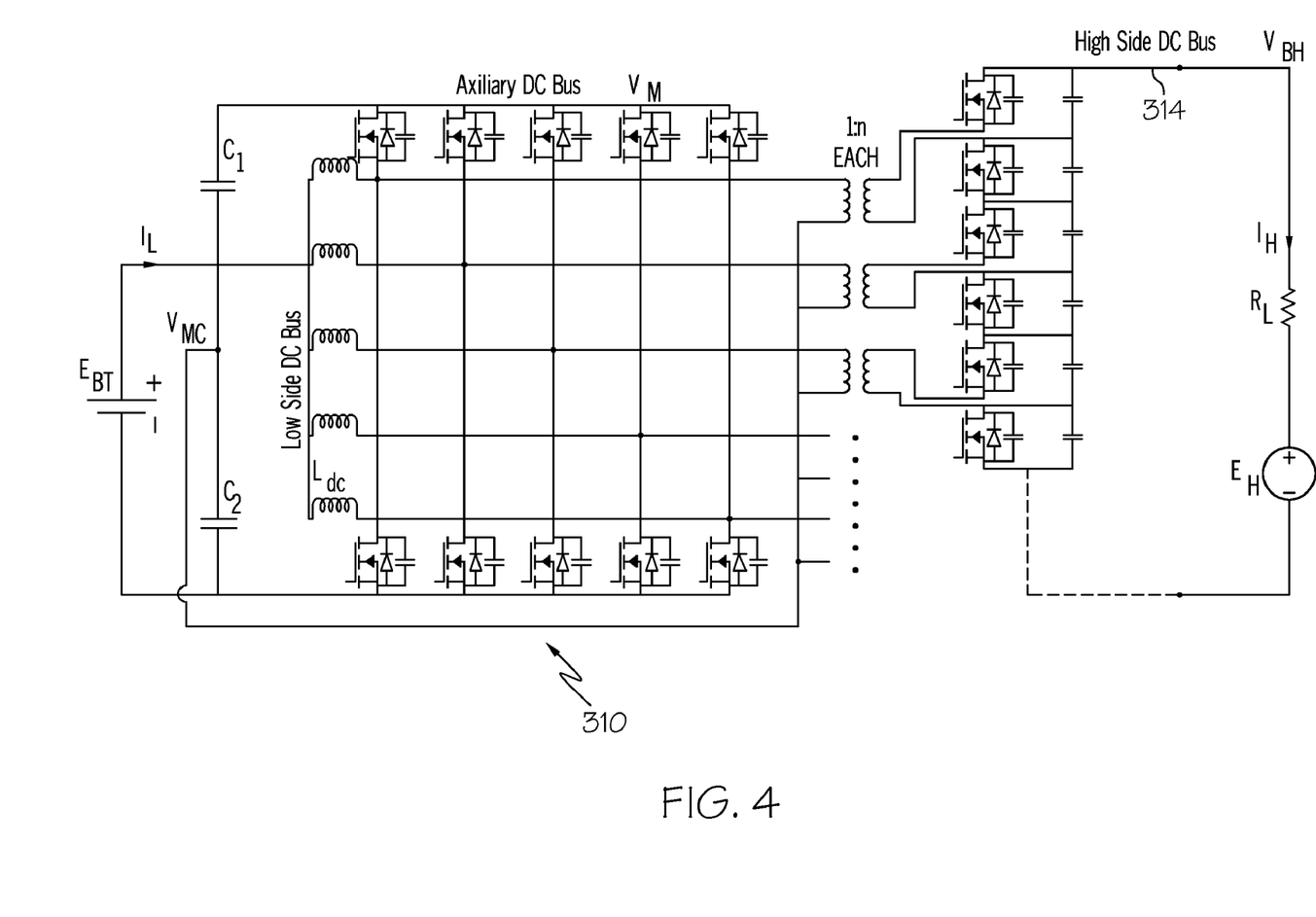
FIG. 4 is a block diagram of a bidirectional power converter with a series connected high side in accordance with an embodiment of the present invention.

Referring now to FIG. 4, a converter 310 may be configured with series connection of modules on a high voltage side 314. In this configuration the converter 310 may be operated with MOSFETS that may operate at a lower voltage than the MOSFETS of a high side connected in the manner of the converter 10 of FIG. 1. This may advantageously result in reduced conduction losses.

Figure 5:
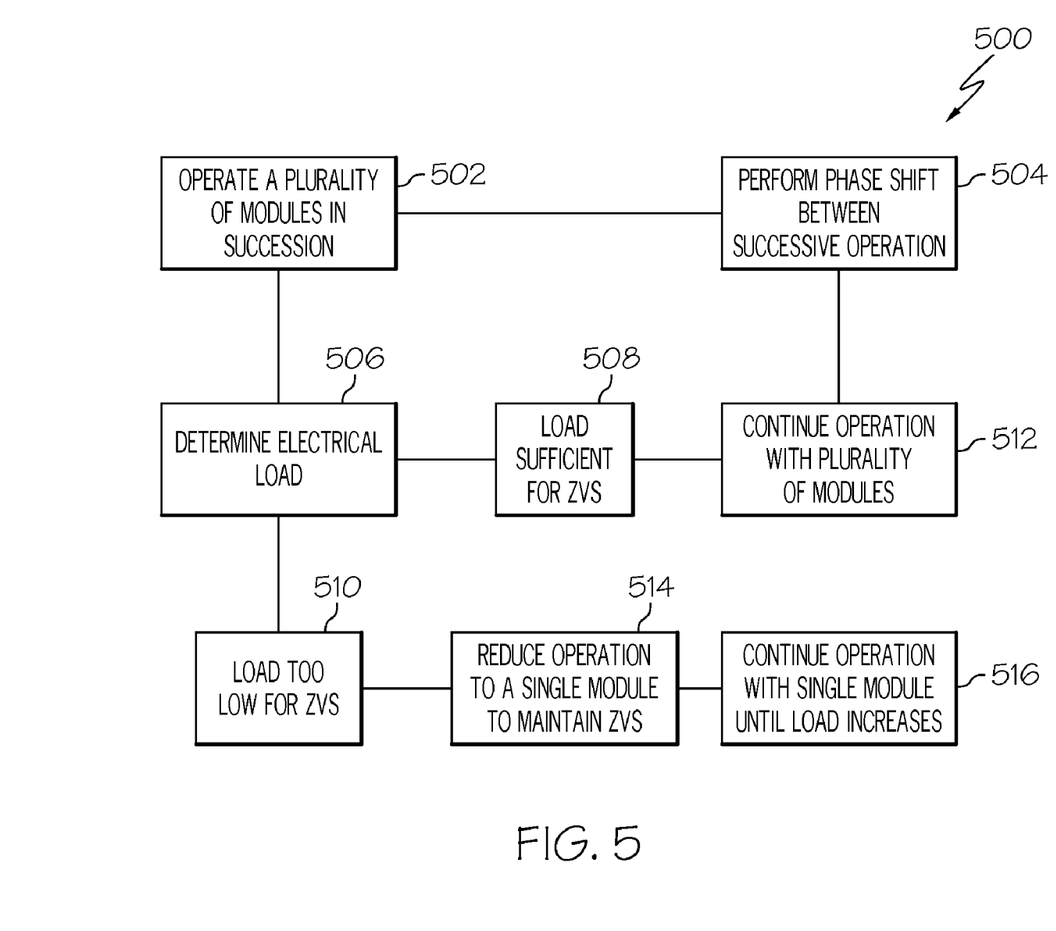
FIG. 5 is a flow chart of a method for converting power in accordance with an embodiment of the present invention.

Referring now to FIG. 5, a flow chart 500 may illustrate an exemplary method which may be employed to bidirectionally convert power in accordance with an embodiment of the invention. In a step 502, a multi-module bidirectional converter may be operated with successive operation of a plurality of converter modules (e.g., the converter 10 may be operated so that the modules 18-1 through 18-n are operated successively). In a step 504 phase shift may be introduced between successive operations of the modules (e.g., the gating controller 16 may produce the signals 16-1 to produce a phase shifting gating pattern so that the phase shifts between the modules 18-1 through 18-n is 2π/n, where n is the number of modules). In a step 506, an electrical load on the converter may be determined. In steps 508 and 510 the determined load may be compared to a minimum load required to maintain ZVS in the operation of the converter in a multi-module mode. In a step 512, the converter may continue operation in a multi-module mode when the load is sufficiently high to permit ZVS. In a step 514, the converter may be taken out of multi-module operation and placed into single module operation to maintain ZVS when the determined load is insufficient to permit ZVS operation of the converter in a multi-module mode. In a step 516 the converter may continue to operate in a sngle module mode until load increases sufficiently to permit multi-module mode operation with ZVS It should be understood, of course, that the foregoing relates to exemplary embodiments of the invention and that modifications may be made without departing from the spirit and scope of the invention as set forth in the following claims.

We claim:

1. A multi-module bidirectional power converter operable in a multi-module mode and in a single module mode comprising:
   a low side common node;
   a high side common node;
   at least a first and a second bidirectional DC/DC converter module each comprising:
   first and second low voltage switches;
   first and second high voltage switches;
   a transformer comprising:
   a low side winding having first and second legs; and
   a high side winding having first and second legs;

wherein, as to each of the at least first and second bidirectional DC/DC converter modules, the first leg of the low side winding is connected with the first and second low voltage switches of the module;

wherein the second leg of the low side winding is connected with the low side common node of the multi-module bidirectional power converter;

wherein, as to each of the at least first and second bidirectional DC/DC converter modules, the first leg of the high side winding is connected with the first and second high voltage switches of the module; and wherein the second leg of the high side winding is connected to the high side common node of the multi-module bidirectional power converter; and whereby the multi-module bidirectional power converter is operable with any one or more of the modules so that efficiency is maintained when electrical loads are high and so that Zero Voltage Switching is maintained when electrical loads are low.

2. The multi-module bidirectional power converter of claim 1 further comprising:
a low side DC bus connected to first sides of the low voltage switches of the at least first and second converter modules;
an auxiliary DC bus connected to second sides of the low voltage switches of the at least first and second converter modules; and
wherein the at least first and second converter modules comprise an inductor interposed between the second sides of the low voltage switches of the converter module and the DC bus.

3. The multi-module bidirectional power converter of claim 2 further comprising:
two low-side splitting capacitors;
wherein the low-side splitting capacitors are interposed between the second sides of the low voltage switches; and
wherein the low side common node is connected to the auxiliary DC bus at a point that is between the two low-side splitting capacitors, whereby the two low-side splitting capacitors are commonly operative for all of the power converter modules.

4. The multi-module bidirectional power converter of claim 1 further comprising:
a gating controller; and
wherein the gating controller produces gating signals that produce successive operation of each of the power converter modules with a phase shift relative to other ones of the power converter modules.

5. The multi-module bidirectional power converter of claim 4 wherein the gating controller produces gating signals that are the same for all of the power converter modules except for the phase shift.

6. The multi-module bidirectional power converter of claim 5 wherein the gating controller produces gating signals that are phase shifted in accordance with the relationship 2 π/n where n is the number of converter modules in the multi-module bidirectional power converter.

7. The multi-module bidirectional power converter of claim 1 further comprising a shunt auxiliary inductor in at least one of the converter modules.

8. A multi-module bipolar bidirectional power converter operable with one or more of its modules comprising:
a gating controller connected to control gating for any one or more power converter modules;
a bipolar low side DC bus having a positive rail, a negative rail and a neutral point;
a bipolar high side DC bus having a positive rail, a negative rail and a neutral point;
at least a first and second ones of the power converter modules, comprising:
a first low voltage switch having a first side connected to the positive rail of the bipolar low side DC bus;
a second low voltage switch having a first side connected to the negative rail of the bipolar low side DC bus;
the first and second low voltage switches having second sides that are connected together;
an inductor interposed between the low side DC bus neutral point and the second sides of the first and second low voltage switches;
a low side winding of a transformer having a first leg connected to the inductor and having a second leg connected to the neutral point of the low side DC bus;
a first high voltage switch having a first side connected to the positive rail of the bipolar high side DC bus;
a second high voltage switch having a first side connected to the negative rail of the bipolar high side DC bus;
the first and second high voltage switches having second sides that are connected together; and
a high side winding of the transformer having a first leg connected to the second sides of the first and second high voltage switching devices and having a second leg connected a neutral point of the high side DC bus.

9. The multi-module bipolar bidirectional power converter of claim 8 further comprising a low side blocking capacitor interposed between the second leg of the low side winding of the transformer and the neutral point of the low side DC bus.

10. The multi-module bipolar bidirectional power converter of claim 8 further comprising a high side blocking capacitor interposed between the second leg of the high side winding of the transformer and the neutral point of the high side DC bus.

11. The multi-module bipolar bidirectional power converter of claim 8 further comprising:
first and a second highside splitting capacitors;
wherein the first highside splitting capacitor is interposed between the neutral point and the positive rail of the high side DC bus;
wherein the second highside splitting capacitor is interposed between the neutral point and the negative rail of the high side DC bus; and
wherein the two highside splitting capacitors are commonly operative for all of the power converter modules.

12. The multi-module bipolar bidirectional power converter of claim 8 wherein the gating controller produces gating signals that produce operation of each of the power converter modules with a duty cycle of 50%.

13. The multi-module bidirectional power converter of claim 8 wherein the gating controller produces gating signals that are the same for all of the power converter modules except for phase shift.

14. The multi-module bidirectional power converter of claim 8 further comprising a shunt auxiliary inductance on at least one of the power converter modules.

15. The multi-module bidirectional power converter of claim 8 wherein the low side of the converter does not have splitting capacitors.

16. A method for bidirectional conversion of power comprising the steps of:
converting power through a plurality of interconnected power conversion modules operated in succession;

employing a phase shifting gating pattern so that each module is operated with a phase shift relative to a prior module of the succession and a phase shift relative to a subsequent module in the succession;

determining a load level for the plurality of conversion modules;

comparing the determined load level against a predetermined low-load condition at which the plurality of conversion modules will not operate with zero voltage switching (ZVS); and changing the gating pattern so that only a single one of the conversion modules operates during the low load condition, whereby the converter continues to operate with ZVS.

17. The method of claim 16 wherein the step of employing a phase shifting gating pattern is performed so that the phase shifts between the modules are equal.

18. The method of claim 17 wherein the step of employing a phase shifting gating pattern is performed so that the phase shifts between the modules is $2\pi/n$, where n is the number of modules.

19. The method of claim 16 further comprising the step of passing current though an auxiliary shunt inductor.

* * * * *

UNITED STATES PATENT AND TRADEMARK OFFICE
CERTIFICATE OF CORRECTION

| | |
|---|---|
| PATENT NO. | : 8,284,576 B2 |
| APPLICATION NO. | : 12/761472 |
| DATED | : October 9, 2012 |
| INVENTOR(S) | : Hamid Danesh-Pajooh-Nejad et al. |

It is certified that error appears in the above-identified patent and that said Letters Patent is hereby corrected as shown below:

On the Title Page

ITEM -73- ASSIGNEE INFORMATION SHOULD READ:

HONEYWELL INTERNATIONAL INC.
MORRISTOWN, NEW JERSEY (US)

QUEEN'S UNIVERSITY AT KINGSTON
KINGSTON, ONTARIO (CA)

Signed and Sealed this
Twenty-fifth Day of March, 2014

Michelle K. Lee
*Deputy Director of the United States Patent and Trademark Office*